United States Patent
Fraser (10) Patent No.: US 6,516,305 B1
(45) Date of Patent: Feb. 4, 2003

(54) AUTOMATIC INFERENCE OF MODELS FOR STATISTICAL CODE COMPRESSION

(75) Inventor: Christopher W. Fraser, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/484,403

(22) Filed: Jan. 14, 2000

(51) Int. Cl.[7] .................... G06F 15/18; G06F 9/45; H03M 7/34
(52) U.S. Cl. ................. 706/8; 717/140; 341/51; 382/224; 706/12
(58) Field of Search ............... 706/45, 8, 12; 341/51; 717/140, 159; 382/232; 709/247; 707/513; 704/222

(56) References Cited

U.S. PATENT DOCUMENTS

| | | | | |
|---|---|---|---|---|
| 5,379,355 A | * | 1/1995 | Allen | 382/56 |
| 5,457,643 A | * | 10/1995 | Vahey et al. | 364/708.1 |
| 5,525,982 A | * | 6/1996 | Cheng et al. | 341/51 |
| 5,583,500 A | * | 12/1996 | Allen et al. | 341/107 |
| 5,794,197 A | * | 8/1998 | Alleva et al. | 704/255 |
| 6,163,811 A | * | 12/2000 | Porter | 707/101 |
| 6,225,922 B1 | * | 5/2001 | Norton | 341/87 |
| 6,404,923 B1 | * | 6/2002 | Chaddha | 382/224 |

OTHER PUBLICATIONS

Riskin et al., Lookahead in Growing Tree–Structured Vector Quantizers, International Conference on Acoustics, Speech and Signal Processing, Apr. 1991, vol. 4, pp. 2289–2292.*
Neilsen et al.; "A DAG–Based Algorithm for Distributed Mutual Exclusion". 11th International Conference on Distributed Computing Systems, May 1991, pp. 354–360.*
Ernst et al.; "Code Compression". Proceedings of the 1997 ACM SIGPLAN Conference on Programming Language Design and Implementation, Jun. 1997, pp. 358–365.*
"Automatic Inference of Models for Statistical Code Compression," Christopher W. Fraser, Apr. 1999, Technical Report MSR–TR–99–20, to appear at ACM PLDI '99. Copyright ©1999 by the Association for Computing Machinery, Inc.

* cited by examiner

Primary Examiner—Thomas Black
Assistant Examiner—Kelvin Booker
(74) Attorney, Agent, or Firm—Merchant & Gould, P.C.

(57) ABSTRACT

Inferring statistical models for performing code compression is disclosed. The system reads a set of training data comprising representative code. Tokens from the training data along with context data known when the token is read is saved to a predictor table. The context data comprises potential predictors for the token. When all training data has been read, a decision tree is created which partitions input code into streams that can be compressed based on the frequency distributions present in the decision tree. The decision tree can be used by a modeler component of a code compression system.

24 Claims, 4 Drawing Sheets

AUTOMATIC INFERENCE OF MODELS FOR STATISTICAL CODE COMPRESSION

FIELD OF THE INVENTION

This invention relates generally to software development environments, and more particularly to compressing representations of computer executable code

COPYRIGHT NOTICE/PERMISSION

A portion of the disclosure of this patent document contains material that is subject to copyright protection. The copyright owners have no objection to the facsimile reproduction by anyone of the patent document or the patent disclosure as it appears in the Patent and Trademark Office patent file or records, but otherwise reserve all copyright rights whatsoever. The following notice applies to the software and data as described below and in the drawing hereto: Copyright© 1999, Microsoft Corporation and the Association for Computing Machinery, Inc., All Rights Reserved.

BACKGROUND OF THE INVENTION

As computer programs have become more complex, the amount of executable code in a typical program has also increased. The increase in the code size results in increased storage requirements of the executable file, and more importantly, increased bandwidth consumption or increased download times when the code is transferred over a network. In addition, many embedded computers have limited amounts of ROM available for program storage. As a result, compression of the executable code is desirable to reduce both storage requirements and network transfer time.

Previous systems have used one or more of several general-purpose data compression systems to reduce the size of executable code. Many general-purpose data compression systems comprise a statistical modeler followed by a coder. As the input is compressed or decompressed, the modeler tracks some context in the input, and associates with each context a probability distribution that the coder (e.g., an arithmetic coder) uses to encode the next token in the input stream. For example, when compressing English text, the letter Q is often followed by the letter U, so a good modeler responds to a Q by switching to a frequency distribution that assigns a high probability to a U and thus encodes it in less space.

Markov models use a number of immediately preceding tokens to help predict and compress the next token. For example, an order-1 model uses the immediately preceding token, an order-2 model uses the 2 immediately preceding tokens and so on. For an alphabet A, an order-N model can use up to $|A|^N$ probability distributions, one for each combination of the last N tokens. Thus, for an alphabet comprising 256 possible values, an order-1 Markov modeler would use 256 probability distributions, and order-2 modeler would use 65,536 probability distributions etc.

Prediction by Partial Matching (PPM) modelers blend or switch on the fly between several Markov models, preferring more history when the recent context has been seen often, and backing off to use less history when it has less experience with the current context.

In each case, the modeler's objective is to assign a non-zero probability to every valid message (sequence of tokens), and high probabilities to messages that resemble those in some representative training set. The higher the probability assigned to a message M comprising tokens $m_1$ $m_2 \ldots m_N$, the shorter its minimum code-length, or entropy.

Code-specific compression mechanisms have been used in addition to the general-purpose compression systems described above. In one example of such code-specific compression, the code produced by compilers is reviewed, either manually or programmatically, for instruction combinations that appear frequently. Then special composite operation codes (opcodes) are designed that replace the frequently appearing instruction combinations. A problem with such an approach is that only set patterns appearing in the code will typically be discovered, while other context that can supply useful information is ignored.

While general-purpose data compression systems can successfully compress compiler generated code, there is a need in the art for systems and methods that can take advantage of the characteristics of compiler generated code to compress such code. In addition, there is a need for such a system that automatically discovers context that can be used to compress the code further than is possible with either general-purpose data compression systems or with the current code compression systems.

SUMMARY OF THE INVENTION

The above-mentioned shortcomings, disadvantages and problems are addressed by the present invention, which will be understood by reading and studying the following specification.

In one system for inferring frequency distribution models for compressing data, the system reads a set of training data. In one aspect of the system, the training data can comprise IR code, however code for virtual or real machines could also be used as training data. Tokens are read from the training data. For each token, certain context is saved. The saved context comprises predictors that can be used to predict the token. The predictors include Markov predictors, computed predictors, and reduced predictors.

In a further aspect of the system, the set of token and predictor values read from the training set is presented to a machine-learning component that applies machine-learning algorithms that create a decision tree. The branch nodes of the decision tree comprise conditions that test the predictor values, while the leaf nodes comprise frequency distribution models that vary depending on the conditions in the paths from the root leading to the leaf nodes. The decision tree created using the system can be input to a modeler component of a code compression system.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
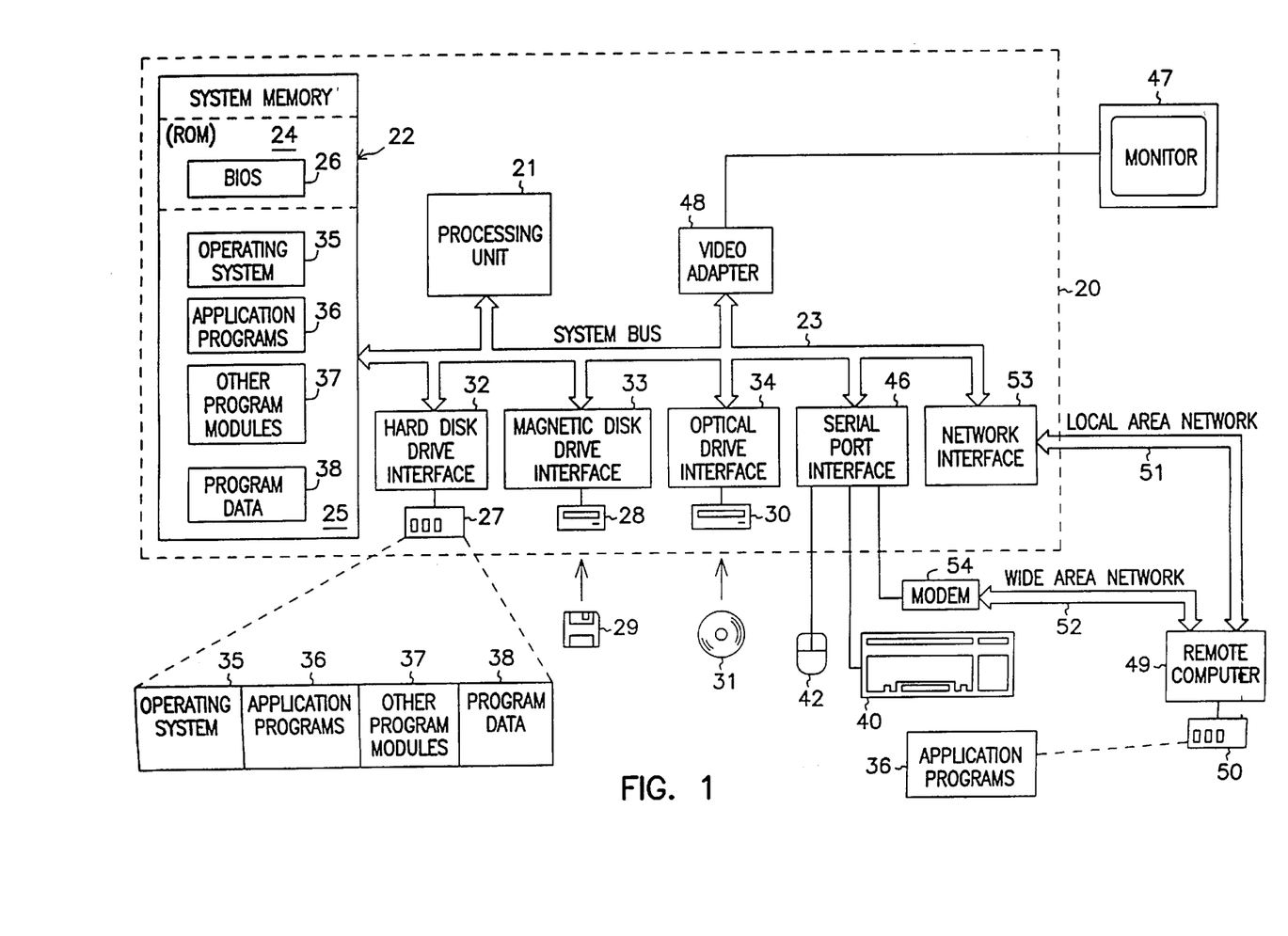
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general-purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
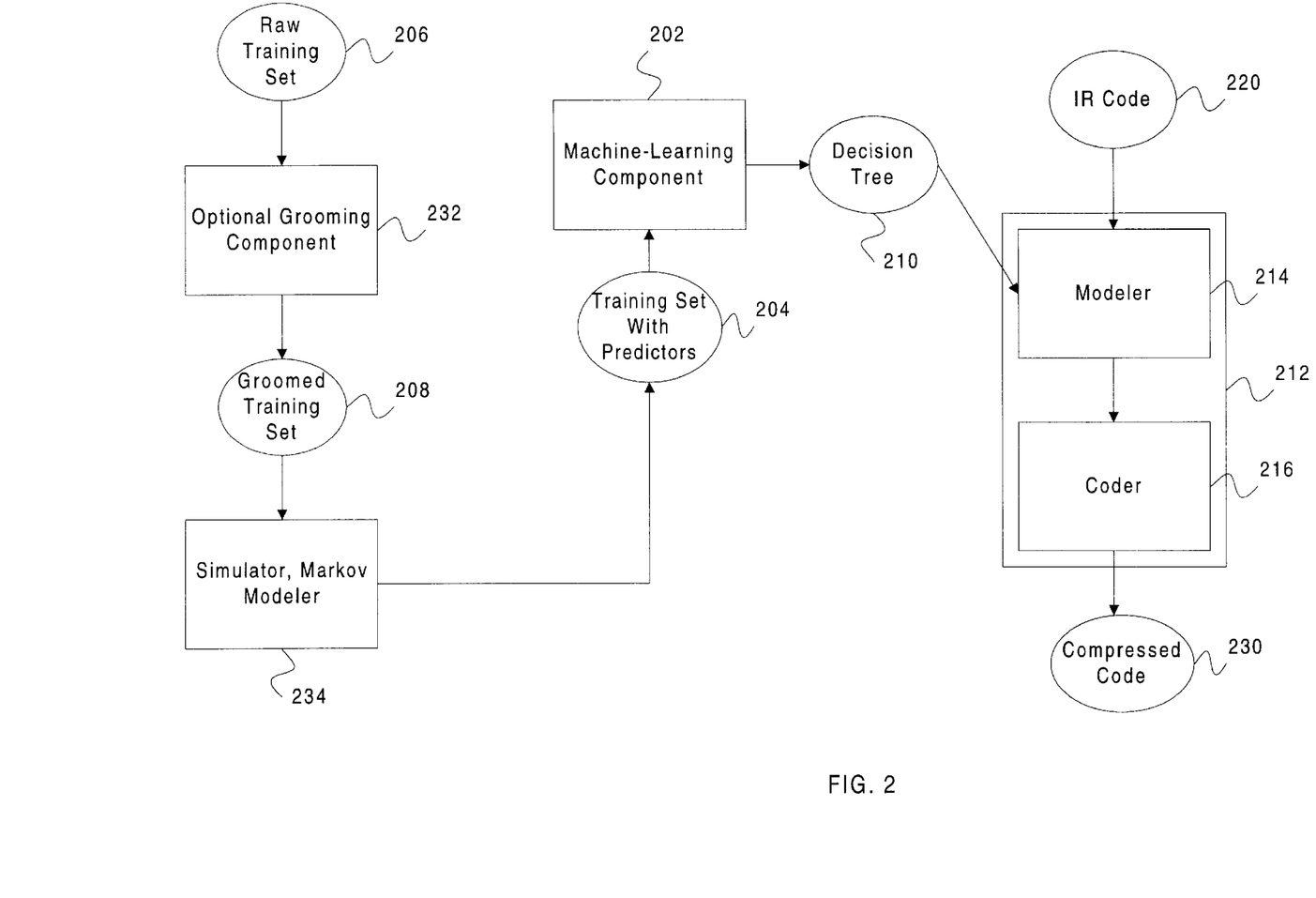
FIG. 2 is a diagram illustrating a system-level overview of exemplary embodiments of a prefetch system.

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. The operating environment includes a machine-learning component 202 and a compressor 212.

Compressor 212 is a component that receives code 220 as input, performs data compression on the input code 220, and produces compressed code 230 as output. Compressor 212 comprises two major components, modeler 214 and coder 216. The input code 220 is presented to the modeler, which maintains a context comprising previously seen tokens in the input stream as well as data computed from such tokens. The modeler uses this context to sift through a decision tree 210 to identify a particular frequency distribution.

Coder 216 is a compression encoder that uses the frequency distribution selected by the modeler to encode the incoming token from input code 220. The encoding uses the frequency distribution to determine an encoding for the token with minimal code-length. Methods for performing such an encoding are known in the art, and the invention is not limited to any particular method of encoding.

The input code 220 is code that has been produced by a compiler that translates source code for a programming language into instructions for a real computer or for an abstract or virtual computer. In one embodiment of the invention, the code 220 is the intermediate representation code (IR code) produced by the "lcc" compiler.

However, the invention is not limited to any particular input code, and the object code output of other compilers can be used. For example, the input code 220 can be x86 code produced by compilers such as the Microsoft Visual C/C++ compiler. In addition, the invention is not limited to code for any particular architecture. For example, code for processors manufactured by Sun Microsystems, Hewlett Packard and other processor manufacturers can be used.

It is desirable but not necessary that the IR code such as code 220 have a postfix format, and that the IR code resemble code for a stack virtual machine (VM). For example, Table 1 illustrates the IR code for the C/C++ statement "i=j" according to an embodiment of the invention.

TABLE 1

| | |
|---|---|
| ADDRGP i | push the address of global i |
| ADDRGP j | push the address of global j |
| INDIRI | pop an address and push the integer at that address |
| ASGNI | pop an address and integer and store the latter at the former |

Those of skill in the art will recognize that other formats are possible and within the scope of the invention.

Machine-learning component 202 is used to produce decision tree 210, which is in turn used by the modeler 214 described above. Machine learning component 202 receives as input training sets 204 annotated with proposed predictors. The training sets 204 comprise the same type of code as the code 220, and include entities normally found in object code. These entities include operators, immediate constants, global identifiers, offsets of locals and formals, and label definitions and references. These training sets are used to produce the decision tree 210.

A simulator/markov modeler 234 is used to create training set 204. The modeler receives training sets as input (either raw training sets 206 or groomed training sets 208). The simulator/markov modeler 234 interprets the code in the training set in order to extract the instructions, operators, and operands contained in the raw or groomed training set that will be the predictors in the annotated training set 204, and to create markov models of the training set.

The predictors annotated in training set 204 are used by the machine-learning component 202 to help determine frequency distributions that predict the next token to appear in a stream of tokens in IR code. An example of such a predictor in IR code is the presence of a comparison operator, because after a comparison instruction, conditional branches are far more common than any other instruction. This is because programmers typically perform comparisons for the purpose of executing one block of code or another, and the compiler generates a branch to or around the code depending on the results of the comparison.

In addition, the operands present in the instruction data stream can serve as predictors. For example, programs that execute an addition opcode are much more likely to add 1 than 3 to a value. Another example is that a load into a register R tends to increase the probability that the next instruction or two reads register R.

In an embodiment of the invention, there are three kinds of predictors: Markov predictors, computed predictors and reduced predictors. Markov predictors comprise the last few tokens seen in the input stream. Typically the number of tokens saved is between ten and twenty, however other numbers of tokens can be chosen. These Markov predictors capture idioms such as the compare-branch and add-1 patterns described above.

Computed predictors are predictors such as the stack height of the virtual machine stack used to process the postfix IR code and the data type (integer, real, or pointer) of the top few stack elements. Computed predictors encode domain specific knowledge that is not explicitly available to general-purpose compressors. For example, general-purpose compressors cannot take advantage of the concept of stack height, as they do not know if the data being compressed is stack oriented or not.

Reduced predictors project a set of related predictors onto a singleton. For example, in an embodiment of the invention, the relational opcodes EQ, NE, GT, GE, LT and LE are projected onto the single predictor REL. Providing such reduced predictors is desirable, because the singleton naturally occurs more frequently than the predictors it represents.

This may allow the machine-learning component 202 to arrive at useful frequency distributions more quickly.

It is also desirable that the reduced predictors not replace the original, unreduced predictors, rather the reduced predictor is provided in addition to the unreduced predictor. The machine-learning component 202 is thus free to choose whichever predictor, reduced or unreduced, that works best in each context. Like the computed predictor, the reduced predictors add domain-specific knowledge to the machine-learning component.

The values for the predictors described above are read or determined from data in the training set. In one embodiment of the invention, the training set comprises a raw training set 206. Raw training set 206 is a large set of compiler IR code that is submitted to the machine-learning component in the same form as produced by the programming language compiler.

In an alternative embodiment of the invention, a grooming component 232 receives as input the raw training set 206, and produces a groomed training set 208. The groomed training set 208 is submitted to the simulator/markov modeler 234. Groomed training set 208 comprises a large set of compiler output forming raw training set 206 that has been preprocessed. It is desirable to perform preprocessing to make certain material in the instruction stream of code 200 more useful to the machine-learning algorithm, and to avoid unnecessary expansion of the data maintained by the machine-learning component.

The preprocessing applied by the grooming component 232 to produce the groomed training set 206 includes the following:

Immediate constants are represented by the corresponding string of decimal digits. For example, the immediate constant having a value of 14 is represented by the lcc IR opcode CNST, the ASCII digit 1, and the ASCII digit 4. It is desirable to use this representation because it results in better compression than the more conventional fixed width representation.

References to globals are separated by the segment to which they refer (code versus data) and passed through what is known in the art as a move-to-front (MTF) coder. The resulting integers are coded as described above with reference to immediate constants, and the escaped string names are moved to a separated string table, which is compressed by a conventional text compressor.

References to locals and formals are also MTF-coded, with their respective buffers cleared between encoding procedures.

Labels are renumbered consecutively, thereby eliminating the need to include a label number with each label definition. Label references are delta-coded, that is, made relative to the number implicit in the last label definition.

In operation, the above-described components operate as follows. A set of training data 206 is optionally presented to a grooming component 232, which grooms the input as described above. The training data is then input to a simulator/markov modeler 234 to compute the predictors, also as described above. The training set and predictors 204 is then presented to a machine-learning program. The machine learning program executes the method described in detail below to read tokens from the training data and place the tokens in a predictor table. Context data comprising the predictor values present at the time the token is read is also saved in the predictor table. The predictor table is then analyzed using machine-learning algorithms and a decision tree is created. The decision tree partitions the IR code input into streams of similar data, with the leaf nodes representing frequency distribution models for the streams. The decision tree can then be used by a modeler component of a code compression program to compress IR code.

Figure 3:
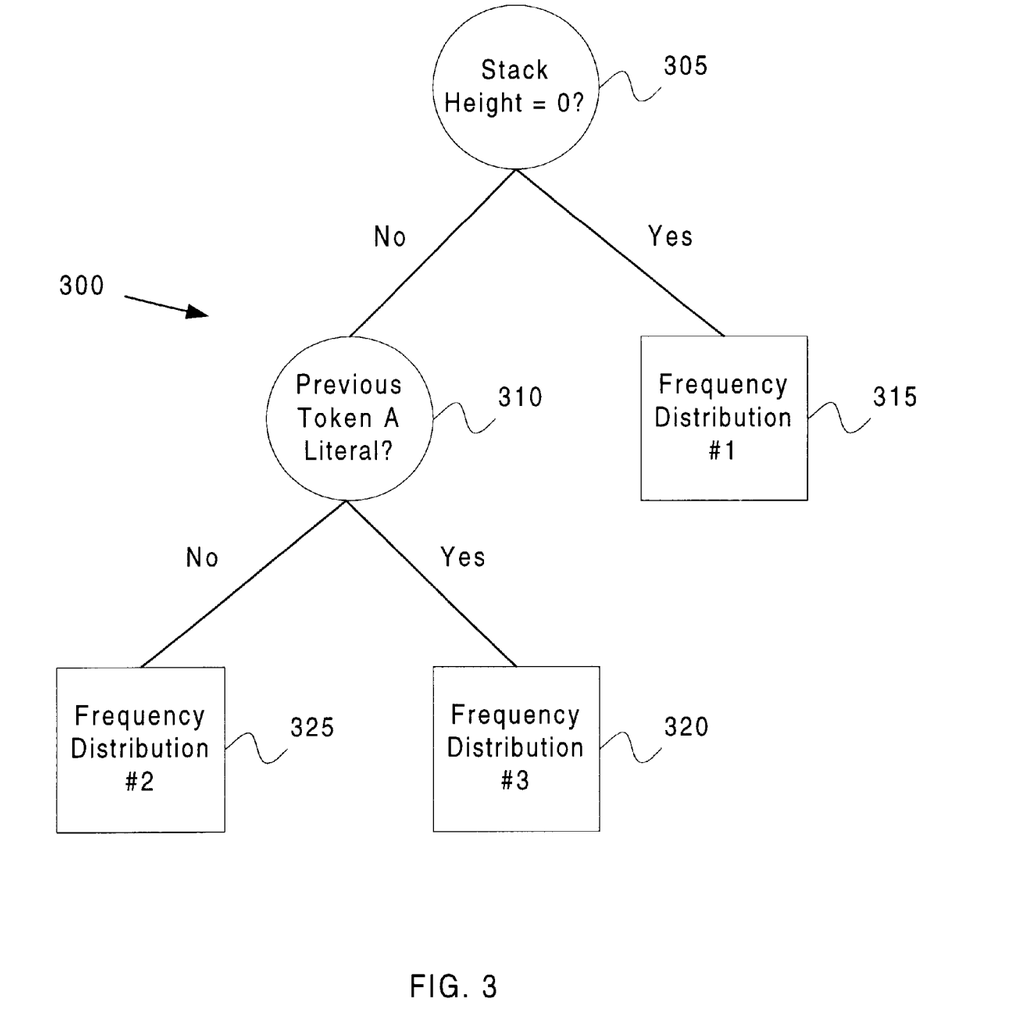
FIG. 3 is an exemplary decision tree according to an embodiment of the invention.

An exemplary representation of a decision tree according to an embodiment of the invention is shown in FIG. 3. The decision tree 300 includes root node 305, branch node 310 and leaf nodes 315, 320 and 325. Root node 305 and branch node 310 represent conditions related to predictor values discovered in the training data. The condition can either be true or false (yes or no). At each leaf node 315, 320 and 325, a frequency distribution is stored that represents the frequency distribution associated with the particular path through the tree. In other words, the frequency distribution at the leaf represents the frequency distribution given the predictor values that lead to the leaf. The decision tree represented in FIG. 3 is shown for illustrative purposes and the invention is not limited to any particular size or configuration of the decision tree. In most cases, the decision tree will be much larger than shown in FIG. 3 due to the number of predictors, the amount of context data saved, and the number of juxtapositions of predictors present in the training set.

Methods for creating the decision tree are presented in further detail in the next section. Data structures for representing decision trees are known in the art.

In an alternative embodiment of the invention (not shown), a version of a decision tree known as a Directed Acyclic Graph (DAG) is formed. A DAG is similar to a decision tree, however instead of one branch leading into a node, a DAG allows multiple branches to lead to a node. Multiple branches are allowed when the branch leads to a section of the tree representing similar contexts or partitions that share frequency distributions. Cycles in the graph are not allowed. A DAG has the advantage that the amount of memory required to represent the tree is reduced because frequency distributions can be shared by multiple branches. Methods for creating and representing a DAG are known in the art.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a flowchart shown in FIG. 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIG. 4 are inclusive of the acts required to be taken by an operating environment executing an exemplary embodiment of the invention.

Figure 4:
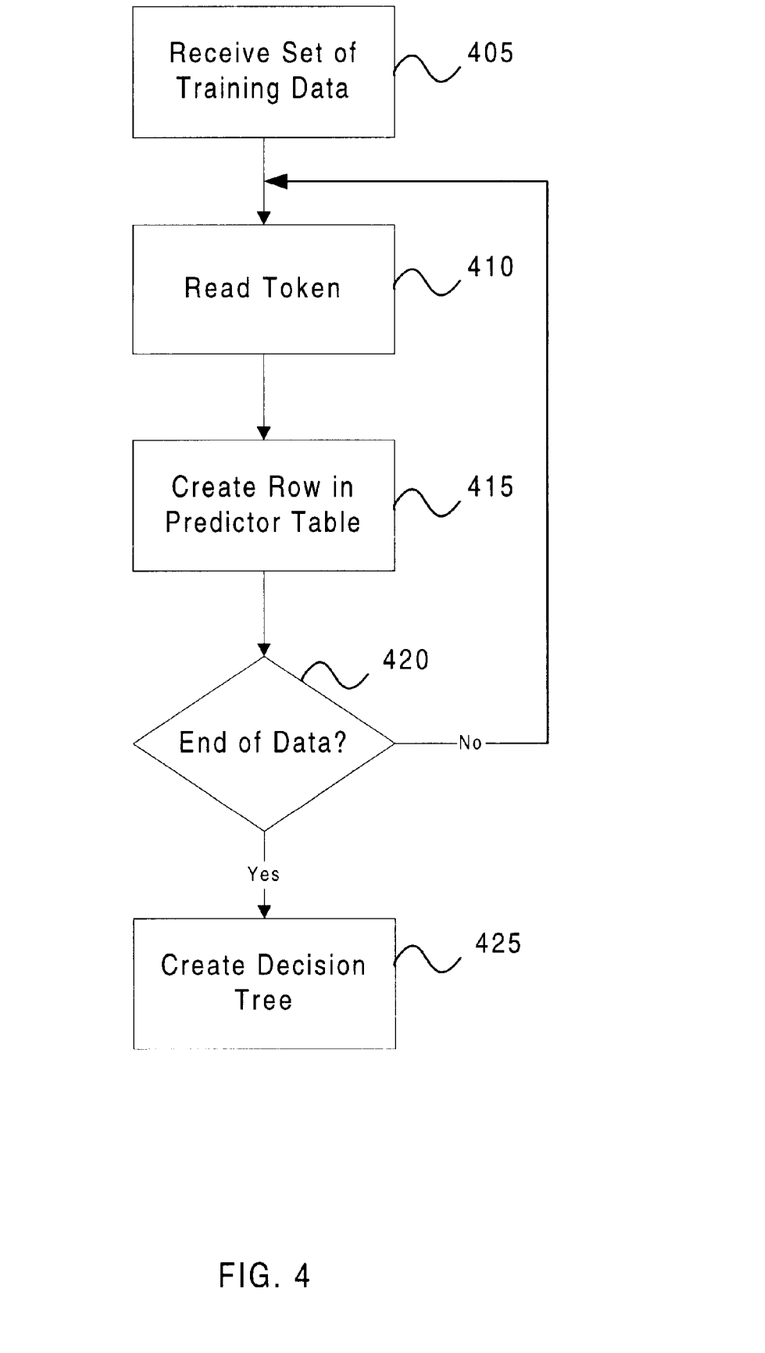
FIG. 4 is a flow diagram illustrating methods for inferring frequency distributions according to exemplary embodiments of the invention.

In FIG. 4, a method for inferring a model for statistical code compression is shown. A program executing the method, such as a machine-learning program begins by receiving a set of training data (block 405). In one embodiment of the invention, the training data comprises IR code. In an alternative embodiment of the invention, the training data comprises IR code that has been groomed, or preprocessed as described above in reference to FIG. 2.

The program then proceeds to read tokens from the training data (block 410). As each token is read, a row is added to a predictor table (block 415). The format of the predictor table according to one embodiment of the invention is shown in table 2 below. The table has been populated with data based on the exemplary IR code represented in Table 1.

TABLE 2

| Predictee | Stack Height | Data Type | Prev 1 | Prev 2 | Prev . . . N |
|---|---|---|---|---|---|
| ADDRG | 0 | None | None | None | . . . |
| ADDRG | 1 | Addr | ADDRG | None | . . . |
| INDIRI | 1 | Addr | ADDRG | ADDRG | . . . |
| ASGNI | 2 | Int | INDIRI | ADDRG | . . . |

As shown in Table 2, each row in the table contains the predictee (i.e. the current token) and the predictors for the predictee that are available just before the predictee was seen. In other words, the context or the state just before the predictee was seen is preserved in the row. Thus, the predictors comprise the state that is available to help predict the predictee. As shown in table 2, the predictors include the stack height, the data type associated with the current token, and a number of previous tokens. The invention is not limited to any particular number of previously seen tokens, however typically ten to twenty previous tokens are saved. In addition, the invention is not limited to the predictors shown in Table 2. For example, in an alternative embodiment of the invention, the data type for each of the previously seen tokens is saved, in addition to the previous token itself. Those of skill in the art will appreciate that other predictor data, including computed or derived predictor data, is possible and within the scope of the invention.

After the current token is processed and inserted into the table, the method checks to see if there are any tokens remaining in the training set (block 420). If there are tokens remaining, the method proceeds to block 410, and processes the token as described above.

When all tokens have been processed and entered into the predictor table, a program executing the method then creates a decision tree (block 425). The predictor table comprises the raw material for the contexts or partitions that are automatically inferred and represented in the decision tree. The creation of decision trees from tables is known in the art. In one embodiment of the invention, the decision tree is created in the following manner:

For each predictor P in the predictor table, and for each value Vp assumed by P in the training set S, perform a trial partition of the sample into two parts: those for which P equals Vp, and those for which P equals something else. Compute the entropy in bits of each part and the sum of the two entropies. Let Emin denote the minimal such sum for all values of P and Vp If Emin is less than entropy(S), then add to the decision tree a node that compares the predictor and value associated with Emin. Partition the sample based on this comparison and recursively infer a decision tree for each half of the partition.

Otherwise, return a decision-tree leaf, namely the probability distribution of the current sample S.

This process converges because eventually the decision tree forms subsamples with only one distinct value, for which the entropy is zero.

The decision tree is then saved for later use by the modeler component of code compressor programs.

Conclusion

Automatically inferring models for use in statistical code compression has been described. The systems and methods of the invention provide advantages not found in previous systems. For example, the system automatically identifies a set of heuristics and patterns that can improve compression in particular contexts. A user of the system need only determine the type of predictors that may be useful in compression, the system automatically determines the combinations of predictors that are truly useful.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while the invention has been described in terms of inferring models for compressing computer-executable code such as IR code, models for other types of data can also be inferred using the invention. The invention can be adapted to produce frequency distribution models and decision trees for compressing any type of data that is presented to a virtual machine or a real machine. In addition, models useful for compressing tree structure data such as XML can also be produced using the system and methods of the invention.

The terminology used in this application is meant to include all of these environments. Therefore, it is manifestly intended that this invention be limited only by the following claims and equivalents thereof.

I claim:

1. A computerized method for inferring a set of frequency distributions for compressing data, the method comprising:
    reading a set of training data, said training data comprising a tree structure, said training data having tokens;
    for each token in the training data setting a predictee field of a predictor table to the token and setting at least one predictor field to a predictor value associated with the token;
    creating a decision tree, said decision tree having a plurality of condition nodes and leaf nodes, each condition node comprising one of the predictor values and each leaf node comprising a frequency distribution for a set of conditions formed by the path of conditions leading from a root node to the leaf node; and
    supplying the decision tree to a modeler for a compressor.

2. The computerized method of claim 1, wherein the predictor value is a data type of the token.

3. The computerized method of claim 1, wherein the predictor value is a previously seen token.

4. The computerized method of claim 3, wherein the predictor value is a data type associated with the previously seen token.

5. The computerized method of claim 1, wherein the decision tree is represented as a Direct Acyclic Graph (DAG).

6. The computerized method of claim 1, wherein the predictor value is a reduced predictor representing a set of related predictors.

7. A computerized method for inferring a set of frequency distributions for compressing data, the method comprising:
    reading a set of training data, said training data having tokens;
    for each token in the training data setting a predictee field of a predictor table to the token and setting at least one predictor field to a predictor value associated with the token, wherein the predictor value is a stack height;

creating a decision tree, said decision tree having a plurality of condition nodes and leaf nodes, each condition node comprising one of the predictor values and each leaf node comprising a frequency distribution for a set of conditions formed by the path of conditions leading from a root node to the leaf node; and supplying the decision tree to a modeler for a compressor.

8. A computerized method for inferring a set of frequency distributions for compressing data, the method comprising:

reading a set of training data, wherein the training data comprising an intermediate representation of computer-executable code, said training data having tokens;

for each token in the training data setting a predictee field of a predictor table to the token and setting at least one predictor field to a context value associated with the token;

creating a decision tree, said decision tree having a plurality of condition nodes and leaf nodes, each condition node comprising one of the predictor values and each leaf node comprising a frequency distribution for a set of conditions formed by the path of conditions leading from a root node to the leaf node; and supplying the decision tree to a modeler for a compressor.

9. A computerized system, comprising:

a computer comprising a processor, a memory, and a computer-readable medium operatively coupled together;

a set of training data stored on the computer-readable medium, said training data comprising at least one of computer executable code, an intermediate representation of computer executable code, XML data, or tree structure data, said set of training data having a plurality of tokens;

a machine learning component executed by the processor and operative to perform the tasks of:

reading the set of training data and for each token in the set of training data saving the token and at least one predictor value to a predictor table; and creating a decision tree from the predictor table.

10. The computerized system of claim 9, wherein the predictor value is a data type of the token.

11. The computerized system of claim 9, wherein the predictor value is a previously seen token.

12. The computerized system of claim 11, wherein the predictor value is a data type associated with the previously seen token.

13. The computerized system of claim 9, wherein the decision tree is represented as a Direct Acyclic Graph (DAG).

14. The computerized system of claim 9, wherein the predictor value is a reduced predictor representing a set of related predictors.

15. A computerized system, comprising:

a computer comprising a processor, a memory, and a computer-readable medium operatively coupled together;

a set of training data stored on the computer-readable medium, said set of training data having a plurality of tokens;

a machine learning component executed by the processor and operative to perform the tasks of:

reading the set of training data and for each token in the set of training data saving the token and at least one predictor value to a predictor table, wherein the at least one predictor value is a stack height; and creating a decision tree from the predictor table.

16. A computerized system, comprising:

a computer comprising a processor, a memory, and a computer-readable medium operatively coupled together;

a set of training data stored on the computer-readable medium, said set of training data comprising an intermediate representation of a computer-executable code, said set of training having a plurality of tokens; and a machine learning component executed by the processor and operative to perform the tasks of:

reading the set of training data and for each token in the set of training data saving the token and at least one predictor value to a predictor table, wherein the training data comprises an intermediate representation of a computer-executable code;

and creating a decision tree from the predictor table.

17. A computer-readable medium having computer-executable instructions to cause a computer to perform a method comprising:

reading a set of training data, said training data comprising tree structure data, said training data having tokens;

for each token in the training data setting a predictee field of a predictor table to the token and setting at least one predictor field to a predictor value associated with the token;

creating a decision tree, said decision tree having a plurality of condition nodes and leaf nodes, each condition node comprising one of the predictor values and each leaf node comprising a frequency distribution for a set of conditions formed by the path of conditions leading from a root node to the leaf node; and supplying the decision tree to a modeler for a compressor.

18. The computer-readable medium system of claim 17, wherein the predictor value is a stack height.

19. The computer-readable medium system of claim 17, wherein the predictor value is a data type of the token.

20. The computer-readable medium system of claim 17, wherein the predictor value is a previously seen token.

21. The computer-readable medium system of claim 20, wherein the predictor value is a data type associated with the previously seen token.

22. The computer-readable medium system of claim 17, wherein the decision tree is represented as a Direct Acyclic Graph (DAG).

23. The computer-readable medium system of claim 17, wherein the predictor value is a reduced predictor representing a set of related predictors.

24. A computer-readable medium having computer-executable instructions to cause a computer to perform a method comprising:

reading a set of training data, said training data having tokens, wherein the training data comprises an intermediate representation of computer-executable code;

for each token in the training data setting a predictee field of a predictor table to the token and setting at least one predictor field to a predictor value associated with the token;

creating a decision tree, said decision tree having a plurality of condition nodes and leaf nodes, each condition node comprising one of the predictor values and each leaf node comprising a frequency distribution for a set of conditions formed by the path of conditions leading from a root node to the leaf node; and supplying the decision tree to a modeler for a compressor.

* * * * *